(12) United States Patent
Clapper et al.

(10) Patent No.: US 10,443,766 B2
(45) Date of Patent: Oct. 15, 2019

(54) SYSTEM, METHOD AND APPARATUS FOR RESTRAINED PIPE JOINT

(71) Applicant: NORTH AMERICAN SPECIALTY PRODUCTS LLC, Houston, TX (US)

(72) Inventors: Joshua E. Clapper, Downingtown, PA (US); Scott Griffith, Janesville, WI (US); Roy Lucas Dean, Schwenksville, PA (US)

(73) Assignee: NORTH AMERICAN SPECIALTY PRODUCTS LLC, Houston, TX (US)

(*) Notice: Subject to any disclaimer, the term of this patent is extended or adjusted under 35 U.S.C. 154(b) by 389 days.

(21) Appl. No.: 15/171,265

(22) Filed: Jun. 2, 2016

(65) Prior Publication Data

US 2016/0356411 A1    Dec. 8, 2016

Related U.S. Application Data

(60) Provisional application No. 62/171,585, filed on Jun. 5, 2015.

(51) Int. Cl.
- *F16L 21/08* (2006.01)
- *F16L 17/02* (2006.01)
- *F16L 37/14* (2006.01)

(52) U.S. Cl.
CPC ............ *F16L 17/02* (2013.01); *F16L 37/148* (2013.01); *F16L 21/08* (2013.01)

(58) Field of Classification Search
CPC . F16L 17/02; F16L 17/03; F16L 17/06; F16L 17/063; F16L 21/08; F16L 37/148;
(Continued)

(56) References Cited

U.S. PATENT DOCUMENTS 2,470,359 A * 5/1949 McLean ............... F16L 21/005
                                                         285/109
3,163,432 A    12/1964 De Boer
(Continued)

FOREIGN PATENT DOCUMENTS

CA    1267175    3/1990
CA    2201221    10/1997
(Continued)

OTHER PUBLICATIONS

Gross "Standard Specification for Poly(Vinyl Chloride) (PVC) Pressure-Rated Pipe (SDR Series)1", 9 pgs, 2015.

*Primary Examiner* — Aaron M Dunwoody
(74) *Attorney, Agent, or Firm* — Lempia Summerfield Katz LLC

(57) ABSTRACT

A pipe may include a pipe body having an axis, an axial bore and a pipe body outer diameter. A male end may be formed on the pipe body. The male end can have an outer diameter consistent with the pipe body outer diameter, and an axial end face. A female end may be formed as an integral bell on the pipe body opposite the male end. The female end may have an inner diameter that is larger than the outer diameter of the male end, a seal recess on an interior thereof, and an interior feature in the interior of the female end that is complementary to the axial end face of the male end. The female end of a first pipe may be configured to receive the male end of a second pipe, such that the interior feature of the first pipe engages and restrains the axial end face of the second pipe. A coupling may be used to join two of the pipes.

12 Claims, 6 Drawing Sheets

(58) Field of Classification Search
CPC . F16L 47/06; F16L 47/12; F16L 25/02; F16L 25/025; F16L 25/04; F16L 25/06; F16L 25/08; F16L 25/14
USPC .......... 285/305, 370, 371, 372, 398
See application file for complete search history.

(56) References Cited

U.S. PATENT DOCUMENTS

| | | | |
|---|---|---|---|
| 3,476,413 A | 11/1969 | Coberly | |
| 3,521,913 A * | 7/1970 | Verhein | F16L 21/005 285/109 |
| 4,042,263 A | 8/1977 | Harrison | |
| 4,111,464 A | 9/1978 | Asano | |
| 4,143,884 A | 3/1979 | Nicholas | |
| 4,538,837 A * | 9/1985 | Cronk | F16L 25/14 285/148.11 |
| 4,779,902 A | 10/1988 | Lee | |
| 4,906,010 A | 3/1990 | Pickering | |
| 5,039,137 A * | 8/1991 | Cankovic | F16L 21/005 285/148.26 |
| 5,255,945 A | 10/1993 | Toon | |
| 5,584,512 A * | 12/1996 | Carstensen | F16L 1/18 285/321 |
| 5,662,360 A | 9/1997 | Guzowski | |
| 5,779,283 A * | 7/1998 | Kimura | F16L 37/146 285/305 |
| 5,791,698 A * | 8/1998 | Wartluft | F16L 37/0925 285/105 |
| 5,816,625 A * | 10/1998 | Clarke | F16L 37/148 285/305 |
| 5,918,914 A | 7/1999 | Morris | |
| 6,739,629 B2 | 5/2004 | Riedy | |
| 6,921,114 B1 * | 7/2005 | Washburn | F16L 25/10 285/305 |
| 7,097,211 B2 | 8/2006 | Adams | |
| 7,108,295 B1 * | 9/2006 | Zarynow | F16L 37/148 285/294.1 |
| 7,963,569 B2 | 6/2011 | Subbaraman | |
| 8,246,084 B2 | 8/2012 | Poddar | |
| 8,516,678 B2 | 8/2013 | Hennemann | |
| 2009/0273184 A1 | 11/2009 | Wright | |

FOREIGN PATENT DOCUMENTS

| | | |
|---|---|---|
| EP | 2157352 | 2/2010 |
| GB | 855608 | 12/1960 |
| JP | 201141142 | 5/2001 |

* cited by examiner

SYSTEM, METHOD AND APPARATUS FOR RESTRAINED PIPE JOINT

This application claims priority to and the benefit of U.S. Prov. Pat. App. No. 62/171,585, filed Jun. 5, 2015, and is incorporated herein by reference in its entirety.

BACKGROUND OF THE INVENTION

Field of the Disclosure

The present invention relates in general to pipes and, in particular, to a system, method and apparatus for a restrained pipe joint.

SUMMARY

Embodiments of a system, method and apparatus for a restrained pipe joint are disclosed. For example, a pipe may include a pipe body having an axis, an axial bore and a pipe body outer diameter. A male end may be formed on the pipe body. The male end can have an outer diameter consistent with the pipe body outer diameter, and an axial end face. A female end may be formed as an integral bell on the pipe body opposite the male end. The female end may have an inner diameter that is larger than the outer diameter of the male end, a seal recess on an interior thereof, and an interior feature in the interior of the female end that is complementary in shape to the axial end face of the male end. The female end of a first pipe may be configured to receive the male end of a second pipe, such that the interior feature of the first pipe engages and restrains the axial end face of the second pipe.

In another embodiment, a system for connecting two pipes may include a coupling having an axis, a generally cylindrical, hollow shape extending in an axial direction, and a coupling outer diameter. A female end may be formed on each axial end of the coupling. Each female end may include an inner diameter that is larger than an outer diameter of the pipes, a seal recess on an interior thereof, and an interior feature in the interior of the female end that is configured to be complementary in shape to an axial end face of the pipes. The female ends of the coupling may receive the pipes, such that the interior features of the coupling engage and restrain the axial end faces of the pipes to form a joint.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for a restrained pipe joint are disclosed.

Integral Bell Pipes

Figure 1:
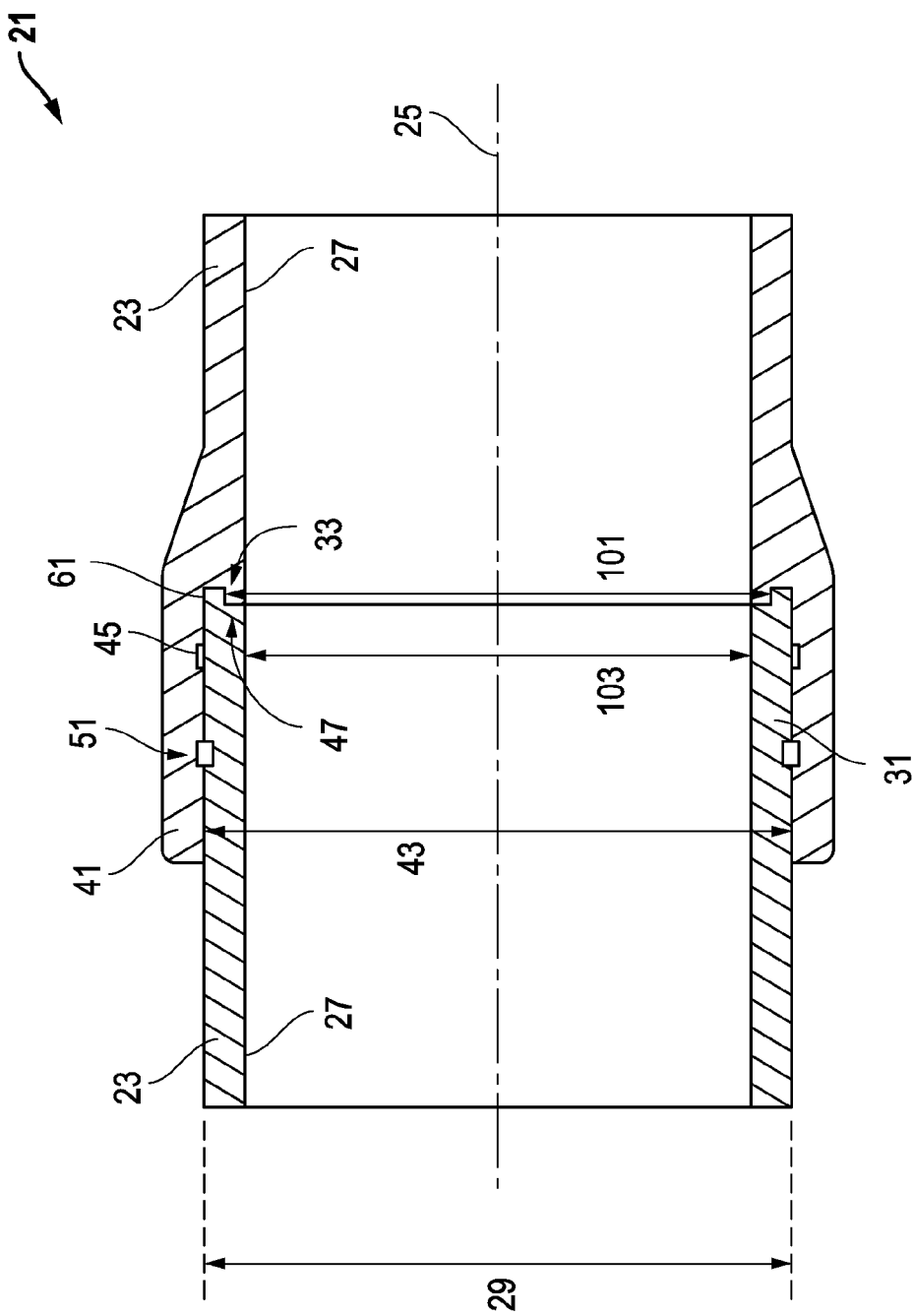
FIG. 1 is sectional side view of an embodiment of a joint between two pipes.
Figure 2:
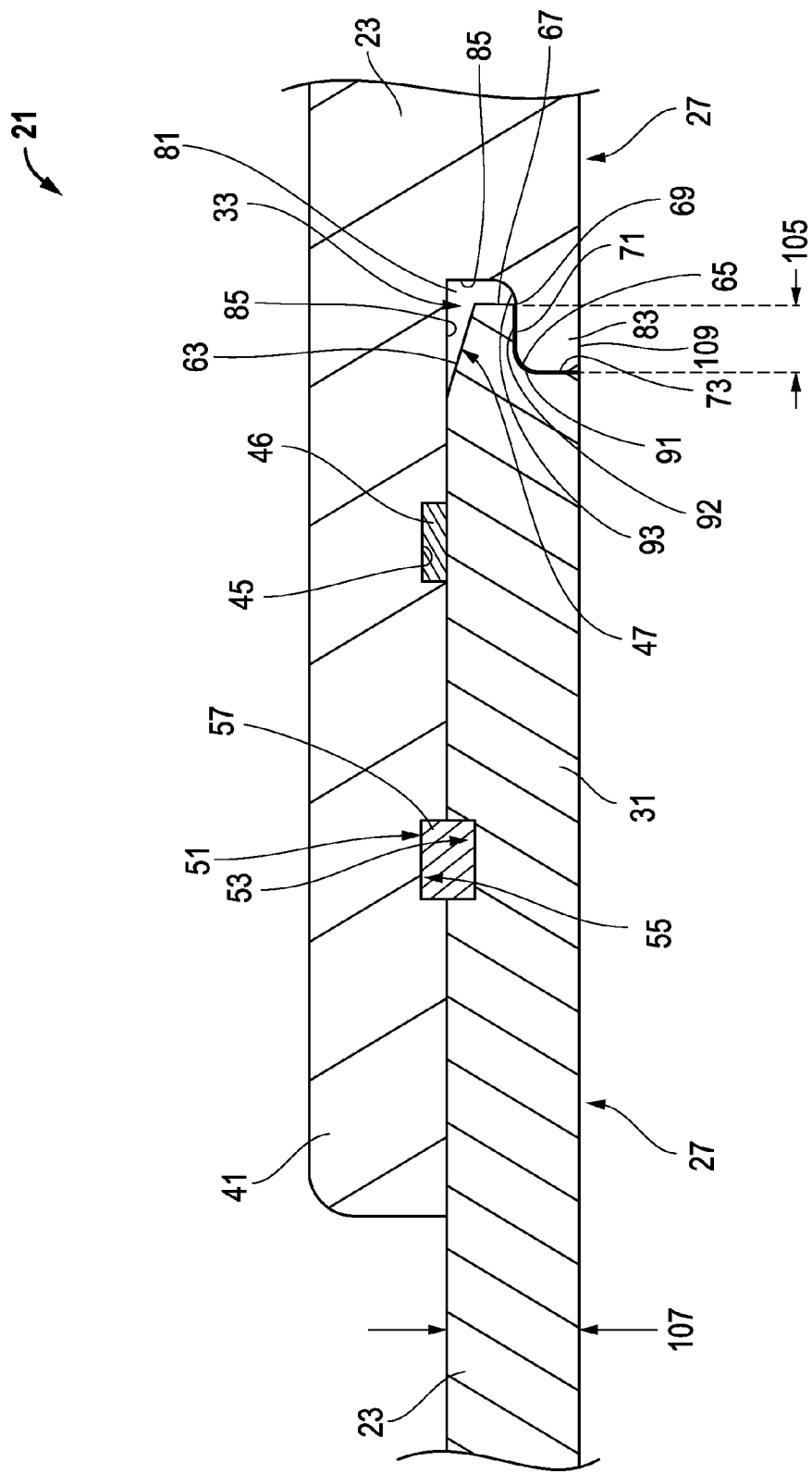
FIG. 2 is an enlarged sectional side view of a portion of an embodiment of the joint of FIG. 1.
Figure 3:
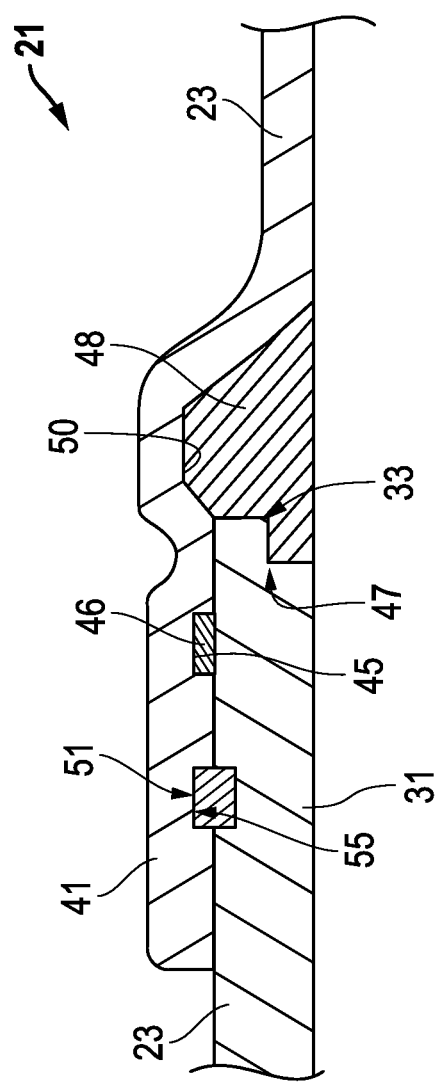
FIG. 3 is an enlarged sectional side view of a portion of an alternate embodiment of the joint of FIG. 1.
Figure 4:
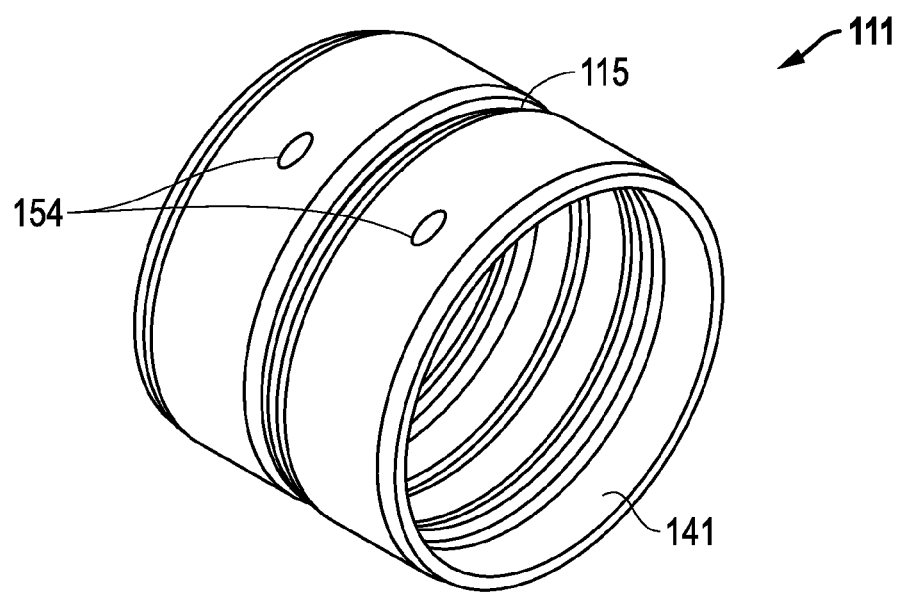
FIG. 4 is an isometric view of an embodiment of a coupling.
Figure 5:
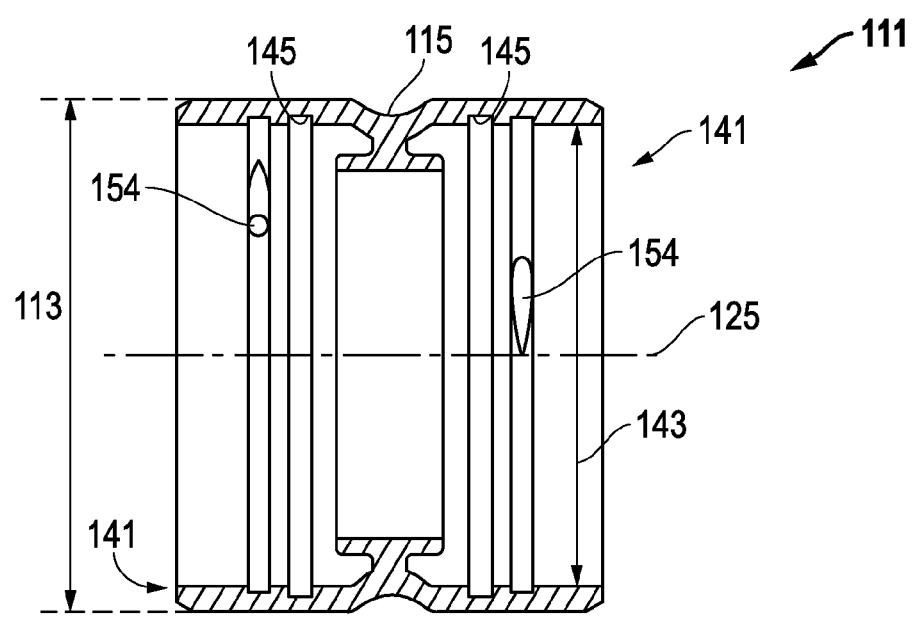
FIG. 5 is a sectional side view of an embodiment of the coupling of FIG. 4.
Figure 6:
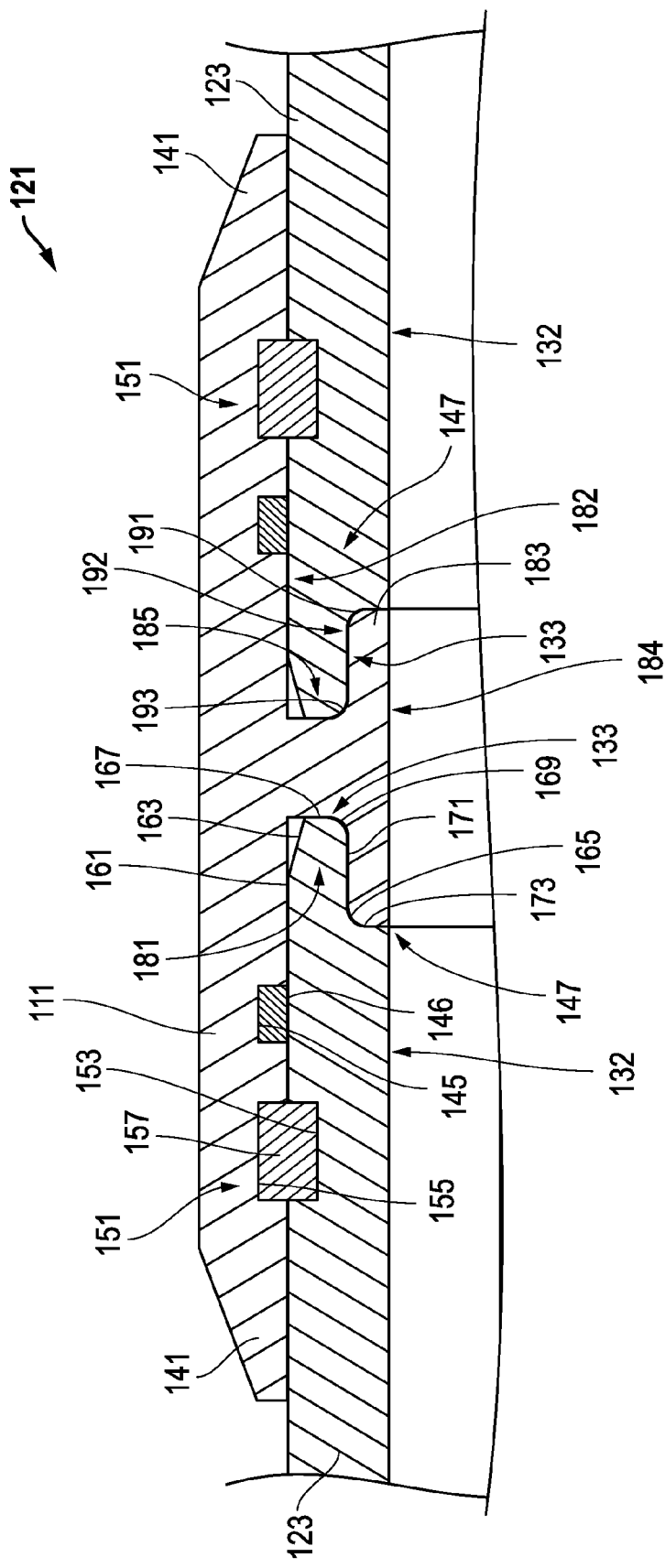
FIG. 6 is an enlarged sectional side view of a portion of an alternate embodiment of a joint between the coupling of FIG. 4 and two pipes.
Figure 7:
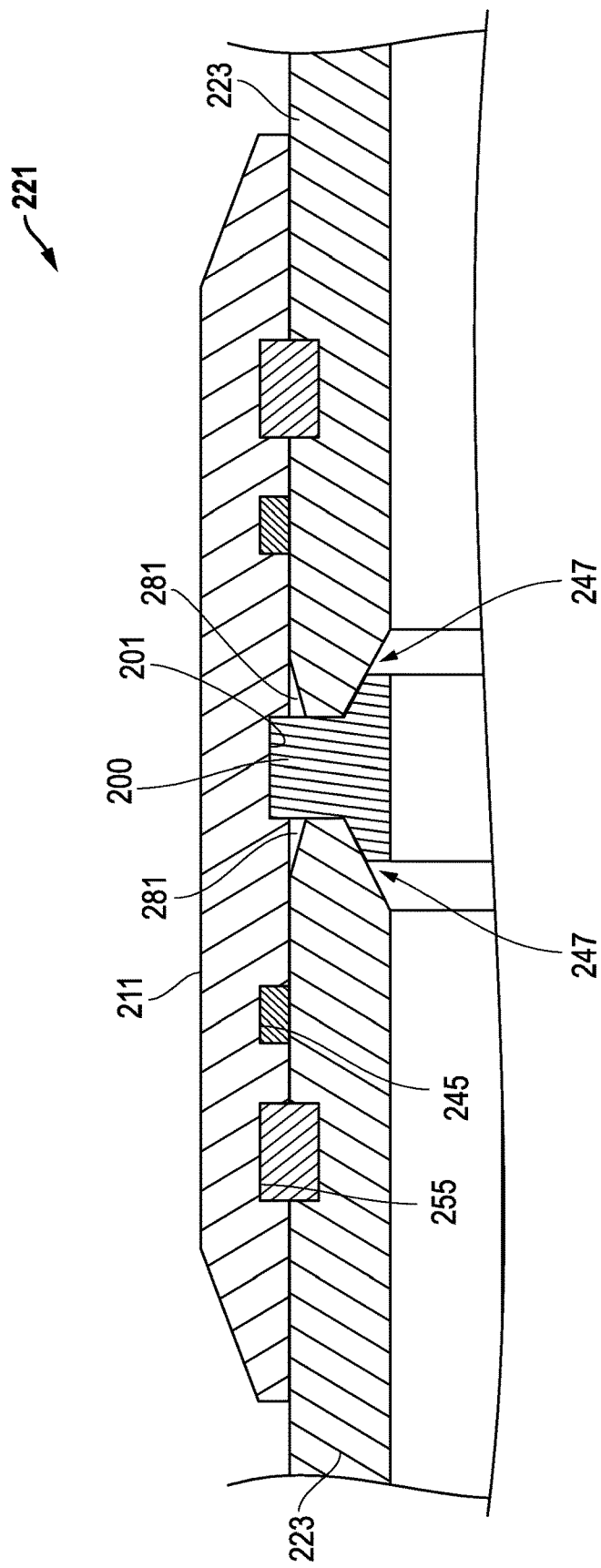
FIG. 7 is an enlarged sectional side view of a portion of another embodiment of a joint between a coupling and two pipes.

For example, one type of pipe joint 21 is shown in FIGS. 1-3, and may be referred to as a restrained joint with an integrated bell. The pipe joint 21 is formed by joining two pipes 23 directly together.

Some versions of the pipe 23 may be identical, or substantially identical to each other. The pipe 23 can have a diameter in a range of about 6 inches to about 72 inches. Embodiments of the pipe 23 can be formed from a material comprising at least one of plastic, composite material, polyvinyl chloride (PVC), molecularly-oriented PVC (PVC-O), polypropylene (PP) and polyethylene (PE).

Other embodiments of the pipe 23 can have an aspect ratio defined as wall thickness at the pipe body with respect to outer diameter. The aspect ratio can be in a range, such as DR12 to DR40, as defined by industry standard ASTM D2241, which is incorporated herein by reference.

Embodiments of each pipe 23 may include a pipe body having an axis 25, an axial bore 27 and a pipe body outer diameter 29. A male end 31 may be formed on one axial end of the pipe body. The male end 31 may include an outer diameter (OD) consistent with or identical to the pipe body outer diameter 29. The male end 31 also may include an axial end face 33.

Embodiments of each pipe 23 also may include a female end 41 formed on the opposite axial end of the pipe body as the male end 31. The female end 41 may be formed as an integral bell, as illustrated. The female end 41 can have an inner diameter 43 that is larger than the outer diameter 29 of the male end 31. An interior of the male end 31 can be substantially radially flush with an interior of the interior feature 47 of the female end 41, such that they have substantially identical interior diameters with the axial bore 27.

In some versions, the female end 41 may include a seal recess 45 on an interior thereof. A seal 46 may be mounted in the seal recess 45. For example, the seal 46 may comprise an o-ring, a gasket, Rieber-type seal, or the like.

Embodiments of the female end 41 also may include an interior feature 47 in the interior that is complementary in shape to the axial end face 33 of the male end 31. The interior feature 47 of the female end 41 can be integrally formed therewith as part of each pipe 23, as shown in FIGS. 1 and 2. Alternatively, and as shown in FIG. 3, the interior feature 47 of the female end 41 also can be a separate element 48 that is installed and secured within each pipe 23. For example, the separate element 48 may be seated in an annular element recess 50 in the interior of the female end 41. The seal recess 45 may be located axially between the annular element recess 50 and a female spline recess 55.

The female end 41 of a first pipe 23 may be configured to receive the male end 31 of a second pipe 23, such that the interior feature 47 of the first pipe 23 engages and restrains the axial end face 33 of the second pipe 23.

In some versions, at least a portion 61 (FIG. 1) of the axial end face 33 may be formed at a same diameter as the pipe body outer diameter 29. In other versions (FIG. 2), an exterior portion of the axial end face 33 has a taper 63, an interior portion of the axial end face 33 has a chamfer 65, and a blunt end 67 extends between the taper 63 and the chamfer 65. In one example, the interior portion of the axial end face 33 is chamfered in two locations 65 and 69. Embodiments of the interior feature 47 of one pipe 23 may engage and restrain at least two perpendicular surfaces (e.g., blunt end 67 and an axial flat 71) of the axial end face 33 of another pipe 23. In one example, the interior feature 47 of one pipe 23 engages and restrains at least three surfaces (e.g., outer flat portion 61, blunt end 67, axial flat 71 and/or a radial flat 73) of the axial end face 33 of another pipe 23.

Embodiments of the interior feature 47 may define a recess 81 that extends axially toward the axial open end of the female end 41. The recess 81 may be defined by an interior surface 85 of the female end 41, a lip 83 protruding axially toward the axial open end of the female end 41, and a wall 85 protruding radially from the interior surface 85 to the lip 83. An interior portion of the recess 81 may be chamfered in two locations, including a chamfer 91 between a distal end of lip 83 and a surface 92 of lip 83, and a chamfer 93 at an interface between the wall 85 and surface 92 on lip 83.

In other embodiments, the axial end face 33 of the male end 31 may be characterized as an annular protrusion. Analogously, the interior feature 47 of the female end 41 may be characterized as an annular axial recess that is complementary in shape to the annular protrusion. The annular protrusion may have an annular protrusion outer diameter that is substantially equal to the outer diameter 29 of the male end 31. The annular protrusion also may have an annular protrusion inner diameter 101 (FIG. 1) that is greater than an inner diameter 103 of the pipe body at the male end 31 (i.e., at axial bore 27). In some versions, the annular protrusion can have an axial length 105 (FIG. 2) that is less than a radial thickness 107 of the pipe body.

Versions of the interior feature 47 of the female end 41 may include a complementary annular lip 109 having an inner diameter substantially equal to an inner diameter 103 of the pipe body at the female end 41. With such elements, features and surfaces, embodiments of the interior feature 47 of one pipe 23 can mechanically interlock with the axial end face 33 of another pipe 23.

Embodiments of the joint 21 and pipe 23 also may include some form of a cooperative restraining mechanism 51. For example, the cooperative restraining mechanism 51 may comprise the following elements: a male spline recess 53 formed on an exterior of the male end 31; a female spline recess 55 on the interior of the female end 41 that registers with a spline aperture (not shown) that extends to an exterior of the female end 41; and the male and female spline recesses 53, 55 axially align on the first and second pipes 23 when the first and second pipes 23 are engaged. The male and female spline recesses 53, 55 may be interlocked with a flexible spline 57.

Coupling for Pipes

As shown in FIGS. 4-7, still other embodiments may comprise a system for connecting two pipes 123 and form a joint 121. For example, the system may include a coupling 111 having an axis 125, a generally cylindrical, hollow shape extending in the axial direction, and a coupling outer diameter 113. A female end 141 may be formed on each axial end of the coupling 111.

Embodiments of each female end 141 may include an inner diameter 143 that is larger than the outer diameter of the pipes 123. A seal recess 145 may be formed on an interior of each female end 141. In addition, each female end 141 may include an interior feature 147 in its interior that is configured to be complementary in shape to an axial end face 133 of the pipes 123. The female ends 141 of the coupling 111 may be configured to receive the pipes 123, such that the interior features 147 of the coupling 111 engage and restrain the axial end faces 133 of the pipes 123 to form the joint 121.

As described herein for other embodiments, the joint 121 may further include a cooperative restraining mechanism 151, but in the examples, for each pipe 123. The cooperative restraining mechanism 151 may include a female spline recess 155 on an interior of each female end 141 of the coupling 111 that registers with a spline aperture 154 that extends to an exterior of each female end 141 of the coupling 111. A male spline recess 153 may be formed on an exterior of each of the pipes 123. The male and female spline recesses 153, 155 axially align between the pipes 123 and coupling 111.

Embodiments of the female ends 141 may be formed as integral bells on the axial ends of the coupling 111. The female ends 141 may be machined from a starting wall thickness that is in a range of about 1.05 to about 2.0 times thicker than a post-machined wall thickness. In addition, the female ends 141 may be wound as fiberglass lay up.

Some embodiments of the coupling 111 may include a waist 115 located axially between the two female ends 141. The waist 115 can have waist inner diameter and a waist outer diameter that are both smaller than the inner and outer diameters, 143, 113, respectively, of the coupling 111.

In some versions, the joint 121 can have a diameter in a range of about 6 inches to about 72 inches. The coupling 111 and pipes 123 may be formed from a material comprising at least one of plastic, composite material, polyvinyl chloride (PVC), molecularly-oriented PVC (PVC-O)), polypropylene (PP) and polyethylene (PE). The pipes 123 can have an aspect ratio defined as wall thickness with respect to diameter. The aspect ratio can be in a range of DR12 to DR40.

In other embodiments, at least a portion 161 of the axial end face 133 of the pipe 123 can be formed at a same diameter as the pipe body outer diameter. An exterior portion 163 of the axial end face 133 may be tapered, an interior portion f the axial end face 133 can have a chamfer 165, and a blunt end 167 can extend therebetween. An interior portion of the axial end face 133 can be chamfered in two locations, at chamfers 165, 169. Each of the interior features 147 of the coupling 111 may engage and restrain at least two perpendicular surfaces 167, 171 of the axial end face 133 of one of the pipes 123. Alternatively, each of the interior features 147 of the coupling 111 can engage and restrain at least three surfaces (e.g., 161, 167, 171 and 173) of the axial end face 133 of one of the pipes 123. Each of the interior features 147 of the coupling 111 can mechanically interlock with the axial end face 133 of one of the pipes 123. In an example, the male and female spline recesses 153, 155 may be configured to be interlocked with a flexible spline 157.

Embodiments of the interior features 147 of the coupling 111 may define a recess 181 extending axially toward an opening in the female end 141. The recess 181 may be defined by the interior 182 of the female end 141, a lip 183 protruding axially toward the opening in the female end 141, and a wall 185 protruding radially from the interior 182 to the lip 183. The interior portion of the recess 181 may be chamfered in two locations, including a chamfer 191 between a distal end of lip 183 and an axial surface 192, and a chamfer 193 at an interface between the wall 185 and surface 192 on lip 183.

In other examples, an interior surface 132 of the pipes 123 can be substantially radially flush with an interior surface 148 of the interior features 147 of the coupling 111, such that they have substantially identical interior diameters with the axial bore of the pipes 123. In an embodiment, each of the interior features 147 of the female end 141 of the coupling 111 can be integrally formed therewith as part of the coupling 111.

Alternatively, the interior features 247 of an embodiment of the coupling 211 can be one or more separate elements (such as the T-ring 200 shown in FIG. 7) that is/are installed and secured within the coupling 211. The one or more separate elements, such as T-ring 200, may be seated in an annular element recess(es) 201 in the interior of the coupling 211. Each seal recess 245 may be located axially between a respective one of the annular element recesses 281 and a female spline recess 255. Together with pipes 223, coupling 211 can form a joint 221. Various geometries between pipes 223 and coupling 221 may be employed, such as those illustrated in the drawings and those described herein.

As described herein for other embodiments, the axial end faces 133 of the pipes 123 may comprise annular protrusions. Likewise, the interior features 147 of the coupling 111 may include annular axial recesses 181. The annular protrusions can have annular protrusion outer diameters that are substantially equal to the outer diameter of the pipes 123. The annular protrusions can have annular protrusion inner diameters that are greater than an inner diameter of the pipes 123. The annular protrusions also may have axial lengths that are less than a radial wall thickness of the pipes 123.

Similarly, the interior features 147 of the coupling 111 can include an annular lip 183 having a surface 184 with an inner diameter substantially equal to an inner diameter of surfaces 132 of the pipes 123. The system may further include a seal 146 mounted in the seal recess 145. The seal 146 may comprise an o-ring, a gasket, a Rieber-type seal or the like.

In still other embodiments, a method of forming a coupling is disclosed. For example, the method may include forming a coupling stock having a main coupling wall and axial end walls that are thicker than the main coupling wall; cutting the coupling stock to a coupling length to form a coupling; belling each axial end of the coupling; and then forming internal geometry in the coupling, the internal geometry providing at least one of a sealing element, a restraining element and a deflection-resistance element.

In some versions of the method, the thickness of the axial end walls of the coupling are in a range of about 0% to about 35% thicker than the main coupling wall. The coupling length can be not greater than two feet. In other versions, the coupling length can be in a range of about 3 feet to about 10 feet, such that the coupling is suitable for use as a repair stick.

In other embodiments, belling may include pre-heating the coupling and stretching each axial end of the coupling over a mandrel. The axial ends of the coupling can be belled individually, or at a same time. In addition, belling can be done horizontally or vertically. During forming the internal geometry, there may be machining for at least one of seals, splines and interlocking anti-deflection geometry. The coupling may use splines, and the method may further include drilling holes in the coupling tangent to spline grooves.

Alternatively, forming internal geometry may include rotating a gang of saw blades with a follower on an interior of the coupling. Another alternative for forming internal geometry comprises cutting grooves into the coupling before belling. In one example, forming internal geometry may include heat-pressing grooves and geometry into the coupling during belling. Heat-pressing can include heating the coupling and expanding the heated coupling over a beller, the beller having extending radial features that further open the heated coupling to form spline recesses and seal recesses, and when the heating coupling cools and hardens, collapsing the extending radial features of the beller into the beller, and removing the coupling from the beller without damaging the spline recesses and seal recesses. The internal geometry may provide the sealing element, the restraining element and the deflection-resistance element.

An embodiment of a method of forming a coupling may include providing a pipe having an axial bore with an inner diameter that is consistent along an axial length thereof, and an outer diameter that is consistent along the axial length thereof; removing a portion of the pipe, the removed portion having an axial length of not greater than two feet, such that the removed portion has two axial ends with the same inner and outer diameters as the pipe; heating and stretching each axial end of the removed portion to formed belled portions, each belled portion having a belled inner diameter in excess of the pipe outer diameter; and then forming a seal groove and a spline groove inside each belled portion, and a spline recess extending from an exterior of the belled portion to the spline groove.

Other embodiments may include one or more of the following items.

Item 1. A pipe, comprising:
a pipe body having an axis, an axial bore and a pipe body outer diameter;
a male end formed on the pipe body, the male end having an outer diameter consistent with the pipe body outer diameter, and an axial end face;
a female end formed as an integral bell on the pipe body opposite the male end, the female end having an inner diameter that is larger than the outer diameter of the male end, a seal recess on an interior thereof, and an interior feature in the interior of the female end that is complementary in shape to the axial end face of the male end; and wherein
the female end of a first pipe is configured to receive the male end of a second pipe, such that the interior feature of the first pipe engages and restrains the axial end face of the second pipe.

Item 2. The pipe of item 1, wherein the pipe further comprises a cooperative restraining mechanism.

Item 3. The pipe of item 2, wherein the cooperative restraining mechanism comprises:
a male spline recess formed on an exterior of the male end; and
a female spline recess on the interior of the female end that registers with a spline aperture that extends to an exterior of the female end; and
the male and female spline recesses axially align on the first and second pipes when the first and second pipes are engaged.

Item 4. The pipe of item 1, wherein the pipe has a diameter in a range of about 6 inches to about 72 inches.

Item 5. The pipe of item 1, wherein the pipes are formed from a material comprising at least one of plastic, composite material, polyvinyl chloride (PVC), molecularly-oriented PVC (PVC-O), polypropylene (PP) and polyethylene (PE).

Item 6. The pipe of item 1, wherein the pipes have an aspect ratio defined as wall thickness at the pipe body with respect to outer diameter, and the aspect ratio is in a range of DR12 to DR40.

Item 7. The pipe of item 1, wherein at least a portion of the axial end face is formed at a same diameter as the pipe body outer diameter.

Item 8. The pipe of item 1, wherein an exterior portion of the axial end face has a taper, an interior portion of the axial end face has a chamfer, and a blunt end extends between the taper and the chamfer.

Item 9. The pipe of item 8, wherein the interior portion of the axial end face is chamfered in two locations.

Item 10. The pipe of item 1, wherein the interior feature of the first pipe engages and restrains at least two perpendicular surfaces of the axial end face of the second pipe.

Item 11. The pipe of item 1, wherein the interior feature of the first pipe engages and restrains at least three surfaces of the axial end face of the second pipe.

Item 12. The pipe of item 3, wherein the interior feature of the first pipe mechanically interlocks with the axial end face of the second pipe, and the male and female spline recesses are configured to be interlocked with a flexible spline.

Item 13. The pipe of item 1, wherein the interior feature of the first pipe defines a recess extending axially toward an opening in the female end, the recess is defined by the interior of the female end, a lip protruding axially toward the opening in the female end, and a wall protruding radially from the interior to the lip.

Item 14. The pipe of item 13, wherein an interior portion of the recess is chamfered in two locations, including a chamfer between a distal end of the lip and a surface of the lip, and another chamfer at an interface between the wall and the surface of the lip.

Item 15. The pipe of item 1, wherein an interior of the male end is substantially radially flush with an interior of the interior feature of the female end, such that they have substantially identical interior diameters with the axial bore.

Item 16. The pipe of item 1, wherein the interior feature of the female end is integrally formed therewith as part of each pipe.

Item 17. The pipe of item 1, wherein the interior feature of the female end is a separate element that is installed and secured within each pipe.

Item 18. The pipe of item 17, wherein the separate element is seated in an annular element recess in the interior of the female end, and the seal recess is located axially between the annular element recess and a female spline recess.

Item 19. The pipe of item 1, wherein the axial end face of the male end comprises an annular protrusion, and the interior feature of the female end comprises an annular axial recess that is complementary in shape to the annular protrusion.

Item 20. The pipe of item 19, wherein the annular protrusion has an annular protrusion outer diameter that is substantially equal to the outer diameter of the male end.

Item 21. The pipe of item 19, wherein the annular protrusion has an annular protrusion inner diameter that is greater than an inner diameter of the male end.

Item 22. The pipe of item 19, wherein the annular protrusion has an axial length that is less than a radial thickness of the pipe body.

Item 23. The pipe of item 1, wherein the interior feature of the female end comprises an annular lip having an inner diameter substantially equal to an inner diameter of the pipe body.

Item 24. The pipe of item 1, further comprising a seal mounted in the seal recess, the seal comprising an o-ring, a gasket or a Rieber-type seal.

Item 25. A pipe, comprising:
a pipe body having an axis, an axial bore and a pipe body outer diameter;
a male end formed on the pipe body, the male end having an outer diameter consistent with the pipe body outer diameter, an axial end face, and a male spline recess formed on an exterior of the male end;
a female end formed as an integral bell on the pipe body opposite the male end, the female end having an inner diameter that is larger than the outer diameter of the male end, a seal recess on an interior thereof, a female spline recess on the interior thereof that registers with a spline aperture that extends to an exterior thereof, and an interior feature in the interior of the female end that is complementary in shape to the axial end face of the male end; and wherein
the female end of a first pipe is configured to receive the male end of a second pipe, such that the interior feature of the first pipe engages and restrains the axial end face of the second pipe, and the male and female spline recesses axially align.

Item 26. The pipe of item 25, wherein an exterior portion of the axial end face has a taper, an interior portion of the axial end face has a chamfer, and a blunt end extends between the taper and the chamfer.

Item 27. A system for connecting two pipes, comprising:
a coupling having an axis, a generally cylindrical, hollow shape extending in an axial direction, and a coupling outer diameter;
a female end formed on each axial end of the coupling, and each female end is configured to have:
an inner diameter that is larger than an outer diameter of the pipes;
a seal recess on an interior thereof; and
an interior feature in the interior of the female end that is configured to be complementary in shape to an axial end face of the pipes; and wherein
the female ends of the coupling are configured to receive the pipes, such that the interior features of the coupling engage and restrain the axial end faces of the pipes to form a joint.

Item 28. The system of item 27, wherein the joint further comprises a cooperative restraining mechanism.

Item 29. The system of item 28, wherein the cooperative restraining mechanism comprises:
a female spline recess on an interior of each female end of the coupling that registers with a spline aperture that extends to an exterior of each female end of the coupling;
a male spline recess formed on an exterior of each of the pipes; and
the male and female spline recesses axially align between the pipes and coupling.

Item 30. The system of item 27, wherein the female ends are formed as integral bells on the axial ends of the coupling.

Item 31. The system of item 27, wherein the female ends are machined from a starting wall thickness that is in a range of about 1.05 to about 2.0 times thicker than a post-machined wall thickness.

Item 32. The system of item 27, wherein the female ends are wound as fiberglass lay up.

Item 33. The system of item 29, wherein male spline recesses on exteriors of the pipes and female spline recesses axially align.

Item 34. The system of item 27, wherein the coupling has a waist located axially between the two female ends, the waist having a waist inner diameter and a waist outer diameter that are both smaller than the inner and outer diameters, respectively, of the coupling.

Item 35. The system of item 27, wherein the joint has a diameter in a range of about 6 inches to about 72 inches.

Item 36. The system of item 27, wherein the coupling and pipes are formed from a material comprising at least one of plastic, composite material, polyvinyl chloride (PVC), molecularly-oriented PVC (PVC-O)), polypropylene (PP) and polyethylene (PE).

Item 37. The system of item 27, wherein the pipes have an aspect ratio defined as wall thickness with respect to diameter, and the aspect ratio is in a range of DR12 to DR40.

Item 38. The system of item 27, wherein at least a portion of the axial end face is formed at a same diameter as the pipe body outer diameter.

Item 39. The system of item 27, wherein an exterior portion of the axial end face is tapered, an interior portion of the axial end face is chamfered, and a blunt end extends therebetween.

Item 40. The system of item 39, wherein the interior portion of the axial end face is chamfered in two locations.

Item 41. The system of item 27, wherein each of the interior features of the coupling engage and restrain at least two perpendicular surfaces of the axial end face of one of the pipes.

Item 42. The system of item 27, wherein the each of the interior features of the coupling engage and restrain at least three surfaces of the axial end face of one of the pipes.

Item 43. The system of item 29, wherein each of the interior features of the coupling mechanically interlocks with the axial end face of one of the pipes, and the male and female spline recesses are configured to be interlocked with a flexible spline.

Item 44. The system of item 27, wherein each of the interior features of the coupling defines a recess extending axially toward an opening in the female end, the recess is defined by the interior of the female end, a lip protruding axially toward the opening in the female end, and a wall protruding radially from the interior to the lip.

Item 45. The system of item 44, wherein an interior portion of the recess comprises a chamfer between a distal end of the lip and an axial surface, and a chamfer at an interface between the wall and the surface on the lip.

Item 46. The system of item 27, wherein an interior surface of the pipes is substantially radially flush with an interior surface of the interior features of the coupling, such that they have substantially identical interior diameters with the axial bore of the pipes.

Item 47. The system of item 27, wherein each of the interior features of the female end is integrally formed therewith as part of the coupling.

Item 48. The system of item 27, wherein each of the interior features of the coupling is a separate element that is installed and secured within the coupling.

Item 49. The system of item 48, wherein the separate elements are seated in annular element recesses in the interior of the coupling, and the seal recesses are located axially between respective ones of the annular element recesses and female spline recesses.

Item 50. The system of item 27, wherein the axial faces of the pipes comprise annular protrusions, and the interior features of the coupling comprise annular axial recesses.

Item 51. The system of item 50, wherein the annular protrusions have annular protrusion outer diameters that are substantially equal to the outer diameter of the pipes.

Item 52. The system of item 50, wherein the annular protrusions have annular protrusion inner diameters that are greater than an inner diameter of the pipes.

Item 53. The system of item 50, wherein the annular protrusions have axial lengths that are less than a radial wall thickness of the pipes.

Item 54. The system of item 27, wherein the interior features of the coupling comprise an annular lip having an inner diameter substantially equal to an inner diameter of the pipes.

Item 55. The system of item 27, further comprising a seal mounted in the seal recess, the seal comprising an o-ring, a gasket or a Rieber-type seal.

Item 56. A system for connecting two pipes, comprising:
 a coupling body having an axis, a generally cylindrical, hollow shape extending in an axial direction, and a coupling body outer diameter;
 a female end formed as an integral bell on each axial end of the coupling body, and each female end is configured to have:
  an inner diameter that is larger than an outer diameter of the pipes;
  a seal recess on an interior thereof;
  a female spline recess on an interior thereof that registers with a spline aperture that extends to an exterior thereof; and
  an interior feature in the interior of the female end that is configured to be complementary in shape to an axial end face of the pipes; and wherein
 the female ends of the coupling are configured to receive the pipes, such that the interior features of the coupling engage and restrain the axial end faces of the pipes to form a joint.

Item 57. A coupling for connecting pipes, the coupling comprising:
 a coupling body having an axis, a generally cylindrical, hollow shape extending in an axial direction, and a coupling outer diameter;
 a female end formed on each axial end of the coupling body, and each female end is configured to have:
  an inner diameter configured to be larger than an outer diameter of the pipes;
  a seal recess on an interior thereof;
  an interior feature in the interior of the female end that is configured to be complementary in shape to axial end faces of the pipes; and
 the female ends of the coupling body are configured to receive the pipes, such that the interior features of the coupling engage and restrain the axial end faces of the pipes to form a joint.

Item 58. A coupling for connecting pipes, the coupling comprising:
 a coupling body having an axis, a generally cylindrical, hollow shape extending in an axial direction, and a coupling outer diameter;
 a female end formed on each axial end of the coupling body, and each female end is configured to have:
  an inner diameter configured to be larger than an outer diameter of the pipes;
  a seal recess on an interior thereof; wherein the female ends of the coupling body are configured to receive the pipes; and the coupling body has a waist located axially between the two female ends, the waist having a waist inner diameter and a waist outer diameter that are both smaller than the inner and outer diameters, respectively, of the coupling body.

Item 59. A method of forming a coupling, comprising:

forming a coupling stock having a main coupling wall and axial end walls that are thicker than the main coupling wall;

cutting the coupling stock to a coupling length to form a coupling;

belling each axial end of the coupling; and then forming internal geometry in the coupling, the internal geometry providing at least one of a sealing element, a restraining element and a deflection-resistance element.

Item 60. The method of item 59, wherein the thickness of the axial end walls of the coupling are in a range of about 0% to about 35% thicker than the main coupling wall.

Item 61. The method of item 59, wherein the coupling length is not greater than two feet.

Item 62. The method of item 59, wherein the coupling length is in a range of about 3 feet to about 10 feet, such that the coupling is suitable for use as a repair stick.

Item 63. The method of item 59, wherein belling comprises pre-heating the coupling and stretching each axial end of the coupling over a mandrel.

Item 64. The method of item 63, wherein the axial ends of the coupling are belled individually or at a same time.

Item 65. The method of item 59, wherein the belling is done horizontally or vertically.

Item 66. The method of item 59, wherein the forming internal geometry comprises machining for at least one of seals, splines and interlocking anti-deflection geometry.

Item 67. The method of item 66, wherein the coupling uses splines, and the method further comprises drilling holes in the coupling tangent to spline grooves.

Item 68. The method of item 59, wherein the forming internal geometry comprises rotating a gang of saw blades with a follower on an interior of the coupling.

Item 69. The method of item 59, wherein the forming internal geometry comprises cutting grooves into the coupling before belling.

Item 70. The method of item 59, wherein the forming internal geometry comprises heat-pressing grooves and geometry into the coupling during belling.

Item 71. The method of item 70, wherein heat-pressing comprises heating the coupling and expanding the heated coupling over a beller, the beller having extending radial features that further open the heated coupling to form spline recesses and seal recesses, and when the heating coupling cools and hardens, collapsing the extending radial features of the beller into the beller, and removing the coupling from the beller without damaging the spline recesses and seal recesses.

Item 72. The method of item 59, wherein the internal geometry provides the sealing element, the restraining element and the deflection-resistance element.

Item 73. A method of forming a coupling, comprising:

providing a pipe having an axial bore with an inner diameter that is consistent along an axial length thereof, and an outer diameter that is consistent along the axial length thereof;

removing a portion of the pipe, the removed portion having an axial length of not greater than two feet, such that the removed portion has two axial ends with the same inner and outer diameters as the pipe;

heating and stretching each axial end of the removed portion to formed belled portions, each belled portion having a belled inner diameter in excess of the pipe outer diameter; and then forming a seal groove and a spline groove inside each belled portion, and a spline recess extending from an exterior of the belled portion to the spline groove.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system for connecting two pipes, the system comprising:
   two pipes each having a male end;
   a coupling of a non-metallic material and having an axis, a generally cylindrical, hollow shape extending in an axial direction, and a coupling outer diameter;
   a cooperative restraining mechanism configured to secure the two pipes and the coupling to one another; and
   a female end formed on each axial end of the coupling, wherein each female end is configured to have
      an inner diameter that is larger than an outer diameter of the male end of a respective one of the two pipes,
      a seal recess on an interior thereof, and
      an interior feature in the interior of the female end that is configured to be complementary in shape to an axial end face of the male end of the respective one of the two pipes,
   wherein the female ends of the coupling are configured to receive the male ends of the two pipes, such that the interior features of the coupling engage and restrain the axial end faces of the two pipes to form a joint,
   wherein each of the interior features of the female ends is integrally formed therewith as part of and from the non-metallic material of the coupling,
   wherein a portion of each of the interior features axially overlies and engages an interior surface of the respective one of the two pipes, and
   wherein the cooperative restraining mechanism includes
      a male spline recess on an exterior of the male end of each of the two pipes and at extending least partially circumferentially therearound,
      a female spline recess on the interior of each of the female ends that registers with a spline aperture that extends to an exterior of the respective female end, the female spline recess extending at least partially circumferentially around the respective female end and
      a spline inserted through each of the spline apertures and extending along the corresponding male and female spline recesses.

2. The system of claim 1, wherein the two pipes are formed from a material comprising at least one of plastic, composite material, polyvinyl chloride (PVC), molecularly-oriented PVC (PVC-O), polypropylene (PP) and polyethylene (PE).

3. The system of claim 1, wherein an exterior portion of the axial end face of each male end has a taper, an interior portion of the axial end face has a chamfer, and a blunt end extends between the taper and the chamfer.

4. The system of claim 1, wherein the axial end face of each male end comprises an annular protrusion, and the interior feature of each female end comprises an annular axial recess that is complementary in shape to the annular protrusion.

5. The system of claim 1, wherein the interior feature of each female end comprises an annular lip having an inner diameter substantially equal to an inner diameter of a pipe body of the respective one of the two pipes.

6. The system of claim 1, wherein the coupling has a waist located axially between the two female ends, the waist having a waist inner diameter and a waist outer diameter that are both smaller than the inner and outer diameters, respectively, of the coupling.

7. The system of claim 1, wherein each of the interior features of the coupling engages and restrains at least two perpendicular surfaces of the axial end face of one of the two pipes.

8. The system of claim 1, wherein each of the interior features of the coupling mechanically interlocks with the axial end face of one of the two pipes.

9. The system of claim 1, wherein each of the interior features of the coupling defines a recess extending axially toward an opening in the female end, the recess is defined by the interior of the female end, a lip protruding axially toward the opening in the female end, and a wall protruding radially from the interior to the lip.

10. The system of claim 1, wherein the interior surfaces of the two pipes are substantially radially flush with an interior surface of the interior features of the coupling, such that they have substantially identical interior diameters with the axial bore of the two pipes.

11. The system of claim 1, wherein the axial faces of the two pipes comprise annular protrusions, and the interior features of the coupling comprise annular axial recesses.

12. The pipe of claim 1, wherein the coupling is formed from a material comprising at least one of plastic, composite material, polyvinyl chloride (PVC), molecularly-oriented PVC (PVC-O), polypropylene (PP) and polyethylene (PE).

* * * * *